United States Patent [19]

Geiger et al.

[11] Patent Number: 5,197,711
[45] Date of Patent: Mar. 30, 1993

[54] FLUID CONNECTION AND CONTROL DEVICE FOR FLUID MACHINES

[75] Inventors: Robert E. Geiger; John M. Clapp, both of Sayre, Pa.

[73] Assignee: Ingersoll-Rand Company, Woodcliff Lake, N.J.

[21] Appl. No.: 809,109

[22] Filed: Dec. 13, 1991

Related U.S. Application Data

[63] Continuation-in-part of Ser. No. 723,770, Jul. 1, 1991, abandoned.

[51] Int. Cl.[5] .............................................. F16K 51/00
[52] U.S. Cl. .................................... 251/152; 251/148; 251/363; 137/596.2
[58] Field of Search ...................... 137/596.2; 251/256, 251/242, 361, 362, 363, 149.4, 148, 904, 152

[56] References Cited

U.S. PATENT DOCUMENTS

| | | | |
|---|---|---|---|
| 2,377,115 | 5/1945 | Von Der Werff | 137/596.2 |
| 2,410,600 | 11/1946 | Cowles | 285/256 |
| 2,959,188 | 11/1960 | Kepner | 251/363 |
| 3,093,357 | 6/1963 | Rodgers et al. | 251/149.4 |
| 3,262,721 | 7/1966 | Knight | 285/242 |
| 3,481,367 | 12/1969 | Deuschle | 251/504 |
| 5,020,774 | 6/1991 | Christionson | 251/148 |

FOREIGN PATENT DOCUMENTS

| | | | |
|---|---|---|---|
| 1158431 | 1/1958 | France | 251/148 |
| 1030485 | 5/1966 | United Kingdom | 285/256 |

*Primary Examiner*—A. Michael Chambers
*Attorney, Agent, or Firm*—Walter C. Vliet; Robert F. Palermo

[57] ABSTRACT

A fluid connection and control device for fluid machines permtis fluid inlet or outlet connections without the necessity for threaded adapters. This is accomplished by a radially symmetrical body having first and second ends and a central axial fluid passage connecting the ends. The body is appropriately sized for the fluid channel of the fluid machine and has a provision at the first end for attachment of a flexible hose. The second end has a provision for a fluid tight seal between the body and the fluid channel as well as a mechanism by which the body is captured within the fluid channel of the fluid machine. Options are provided for incorporation of a valve mechanism for controlling the fluid flow. The valve mechanism may be incorporated as an integral part of the body or as a separate modular unit which is retained in the fluid channel by the connector body. This provides the advantages of rapid assembly and avoidance of undue stresses to the fluid machine housing, and also provides flexibility of the hose directly adjacent the housing which contributes to improved maneuverability.

13 Claims, 5 Drawing Sheets

FLUID CONNECTION AND CONTROL DEVICE FOR FLUID MACHINES

This application is a continuation-in-part of application Ser. No. 07/723,770, filed Jul. 1, 1991 now abandoned.

BACKGROUND OF THE INVENTION

This invention relates generally to fluid machines and more particularly to devices for connecting and controlling fluid conduits for fluid machines.

Fluid machines commonly require connection to fluid inlet and/or fluid outlet lines. Such connections are usually accomplished by use of threaded adapters or bayonet style quick connectors. In either case, an adapter of some sort is threaded into the fluid machine while a mating adapter is attached to the appropriate fluid carrying hose or other conduit.

Where mobility is required, as in the case of fluid powered hand held tools, or in cases where the connection point to the fluid machine is fragile, use of threaded adapters may not be desirable. Such adapters usually extend a significant distance from the attachment point and, consequently, may seriously impair mobility or may even lead to fractures of the fluid machine housing at the attachment point. Consequently, when a fluid machine is made from a thin material or low strength material, the housing will be subject to damage from bumping the adapter or from overtightening of the threaded adapter within the housing fluid channel. Thus, damage to the fluid machine housing at the connection point may be caused by inadvertent physical impact during use, or by routine assembly and disassembly.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a fluid connection device for a fluid machine having a radially symmetrical body with first and second ends and a central axial fluid passage connecting the ends. The first end has provision for attachment of a flexible fluid carrying hose, while the second end provides for a circumferential fluid tight seal between the body and a fluid channel of the fluid machine. Between the first and second ends, a retention mechanism is arranged to capture the body within the fluid channel.

The foregoing and other aspects will become apparent from the following detailed description of the invention when considered in conjunction with the accompanying drawing figures.

DETAILED DESCRIPTION

Figure 1:
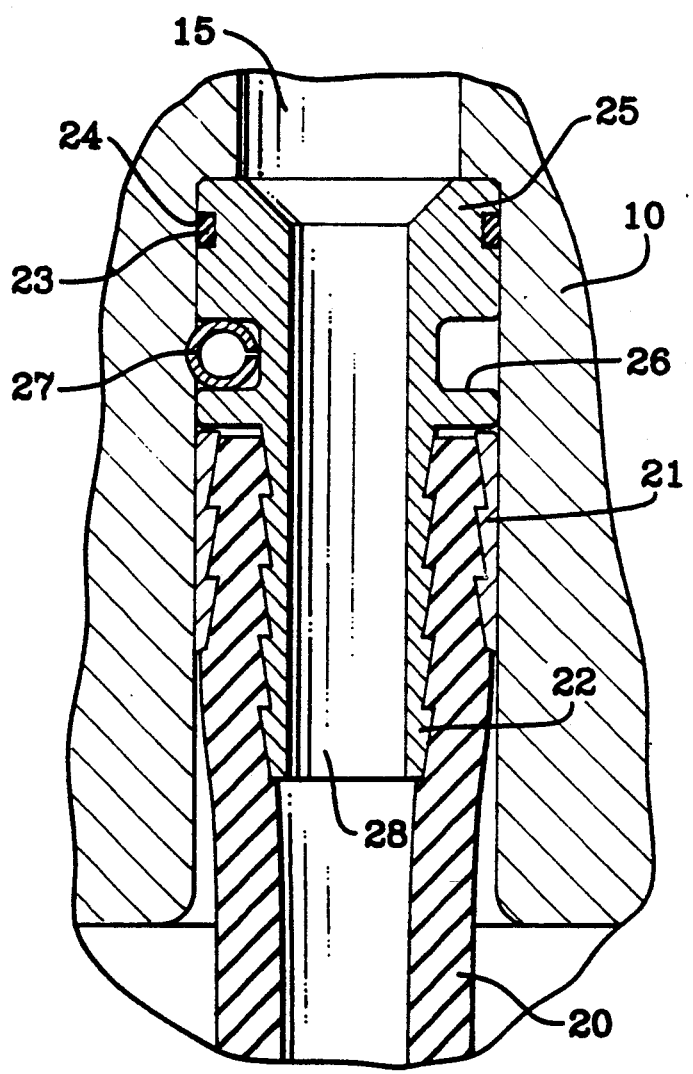
FIG. 1 is a fragmentary partially sectional schematic view of the fluid connection device of the present invention.

Referring to FIG. 1, the features of the fluid connection device are readily understood. A fluid machine housing 10 has a fluid channel 15 through which fluid flows either into or out of the fluid machine. The device has a radially symmetrical body 25 with a central axial fluid passage 28 connecting a barbed nipple 22 at the first end to a sealing arrangement with the fluid channel 15 at the second end. A circumferential seal ring groove 24 on the body 25 provides retention and support for seal ring 23 which provides a fluid tight seal between the outer circumference of the body 25 and the inner wall of fluid channel 15 To capture the body 25 within the fluid channel 15 of housing 10, a retaining pin groove 26 is provided at an intermediate portion of the circumference of body 25. Housing 10 has a retaining pin bore transverse to and tangential with fluid channel 15 Alignment of retaining pin groove 26 with the retaining pin bore permits insertion of retaining pin 27 which captures body 25 within fluid channel 15.

In use, a compression sleeve 21 is slipped over the end of flexible fluid hose 20 and the hose is pushed onto barbed nipple 22 of body 25. Compression sleeve 21 is squeezed about fitting body 25 and the hose/fitting body assembly is inserted into fluid channel 15 of machine housing 10. Retaining pin 27 is inserted into the retaining pin bore in housing 10 through retaining pin groove 26 in radially symmetrical body 25 to capture the assembly within fluid channel 15. Note that compression sleeve 21 may be provided as a split ring which is placed over hose 20 and is radially compressed when the assembly is inserted into fluid channel 15. It may also be formed from metal as a cupped eyelet which is slipped over fluid hose 20 and permanently crimped about the hose to capture it on the barbed nipple 22 of fitting body 25. Some new types of hoses do not require a compression sleeve for retention on the nipple.

The advantages provided by this connection device can be readily appreciated with reference to FIG. 1. Here it can be seen that the connection nipple 22 is completely within fluid channel 15. Thus, hose 20 is free to flex immediately against housing 10. This can provide critical clearance for maneuvering of the fluid machine in restricted spaces. Moreover, it can be seen that there is no stress concentration introduced by this connection device due to its compliant sealing arrangement and its simplified low stress retention provision.

Figure 2:
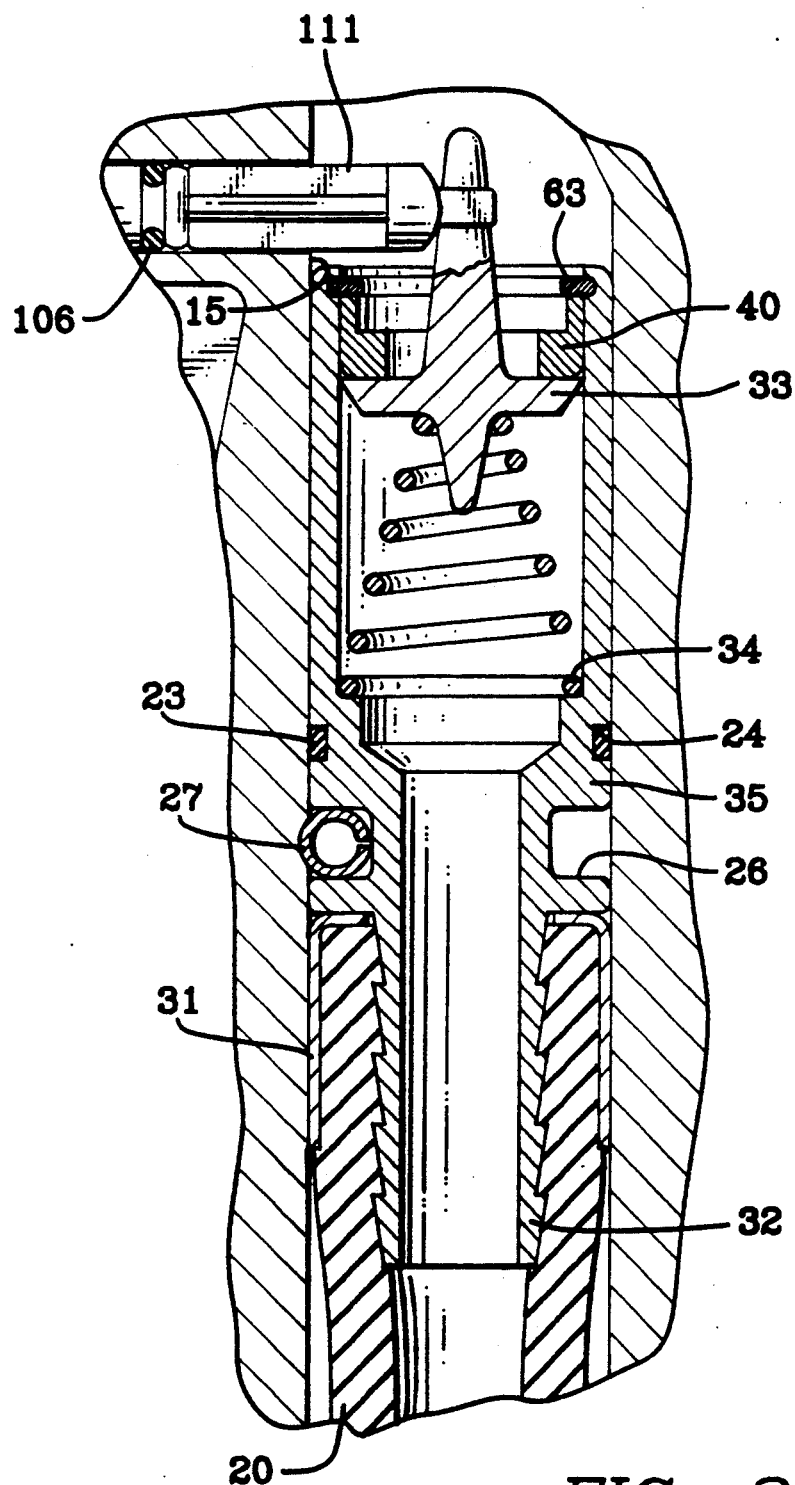
FIG. 2 is a fragmentary partially sectional schematic view of the preferred embodiment of the fluid connection and control device of the present invention.

A combination fluid connection and control device is shown in FIG. 2. Since this arrangement provides fluid shutoff even when the fitting body is removed from the housing, it is the preferred embodiment. Here, the radially symmetrical fitting body 35 incorporates all the features of body 25 previously described with respect to FIG. 1. In addition, at its second end, body 35 incorporates a valve seat 40 which is held in place by valve seat retainer 63. Valve element 33, shown here as a common tilt valve, occludes the fluid passage through valve seat 40. Valve spring 34 biases valve element 33 against seat 40. Fitting body 35 is virtually identical to fitting body 25 shown in FIG. 1 in so far as the fluid connection feature is concerned. Note that barbed nipple 32 of FIG. 2 is functionally identical to barbed nipple 22 of FIG. 1. Retainer 27 and groove 26 as well as seal ring 23 and groove 24 are again functionally identical to their counterparts in FIG. 1. Compression sleeve 31 is shown as the cupped eyelet version which was discussed earlier. This is the version which requires crimping with a special tool in order to lock hose 20 on barbed nipple 32. The view presented in this figure approximates the arrangement that would be seen in the pistol grip handle of a power tool.

Figure 3:
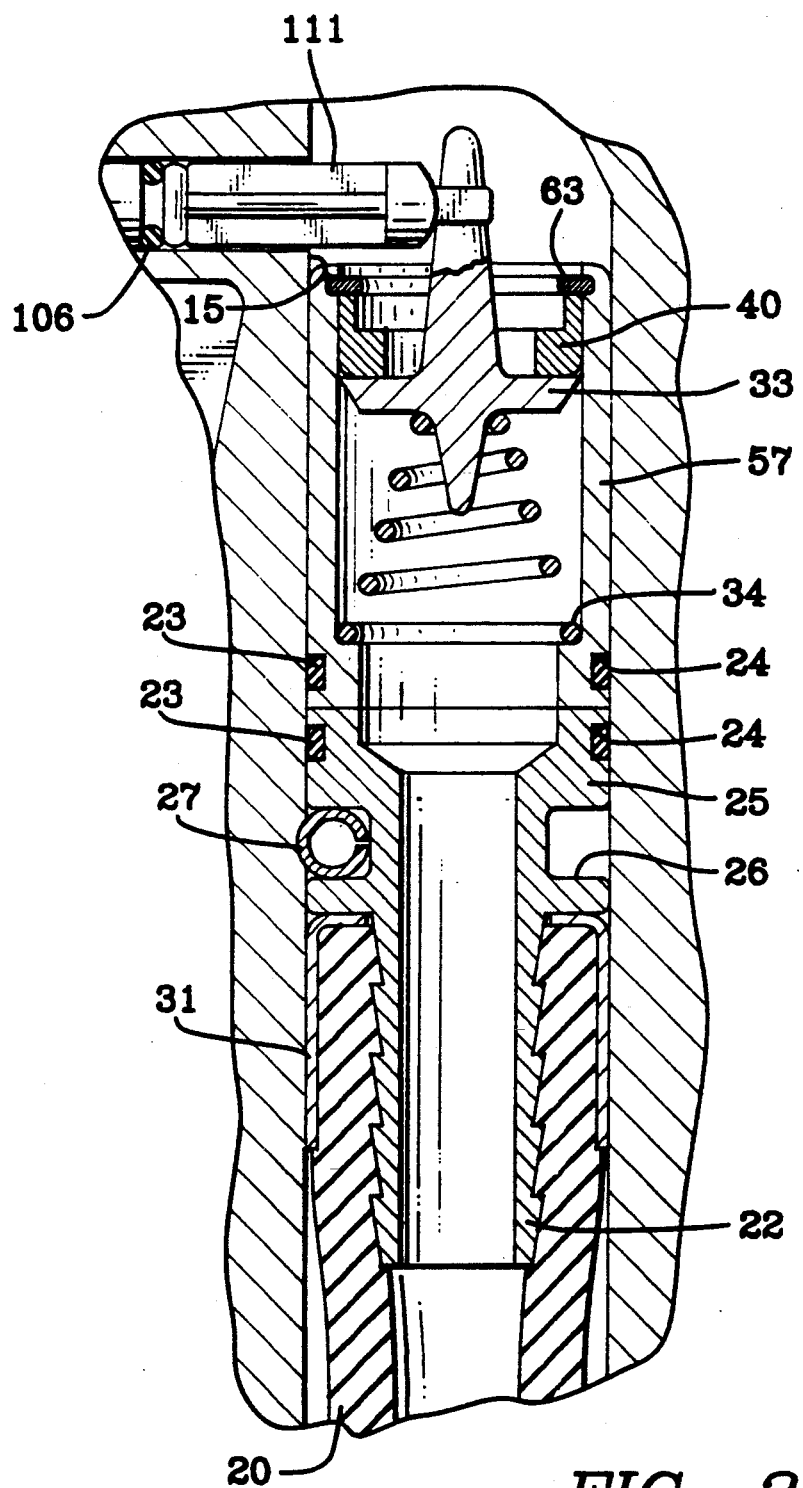
FIG. 3 is the fragmentary partially sectional schematic view of an alternative embodiment of the fluid connection and control device.

FIG. 3 shows the features of an alternative embodiment to that of FIG. 2 which provides all the features thereof. With the exception of compression sleeve 31 the fluid connection portion of this figure is identical to that of FIG. 1. The fluid control function is provided by a modular valve assembly which is held in fluid channel 15 by fluid connection fitting body 25. The control valve assembly includes fitting body 57, valve seat 40, valve element 33, biasing spring 34, valve seat retainer 63, and seal ring 23 in seal ring groove 24.

Figure 4:
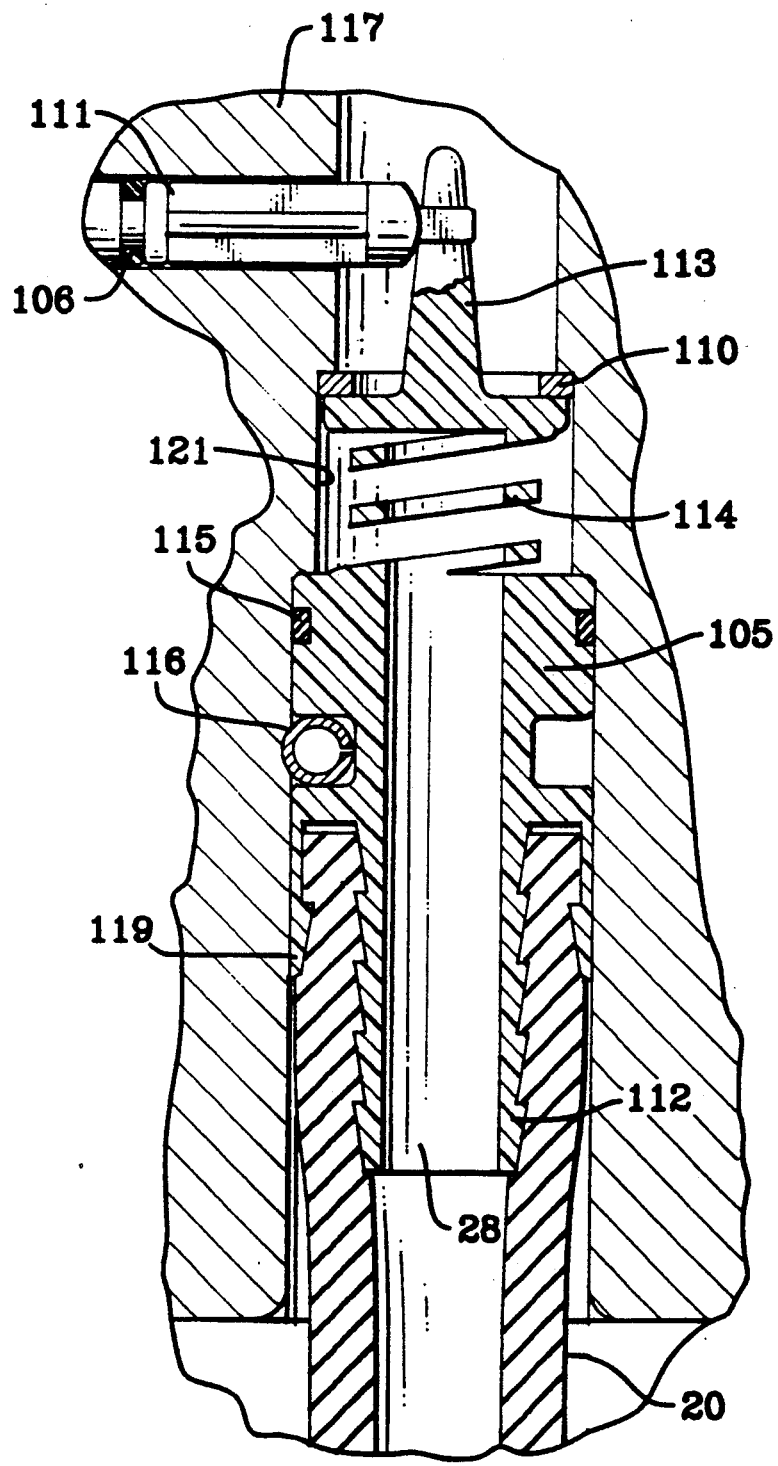
FIG. 4 presents another possible embodiment of the fluid connection and control device.

FIG. 4 shows another embodiment of the fluid connection and control device. This time, the valve seat is provided as part of the housing. In this case, a one piece connection and control assembly is molded or otherwise formed. It consists of a fitting body 101 having a barbed nipple 112 for receiving flexible hose 20. Spaced outwardly from barbed nipple 112 are hose retention fingers 119 which perform the function of the compression sleeves in this embodiment. Retention pi 116 and seal ring 115 are functionally identical to the counterpart items previously described. Valve element 113 is biased against valve seat 110 by valve spring 114. Valve seat 110 is fitted within inlet fluid channel 121 of housing 117. Valve element 113 is moved by valve actuator 111 which protrudes through housing 117 into fluid channel 121. Leakage from fluid channel 121 along valve actuator 111 is prevented by actuator seal ring 106. Although this embodiment is difficult to make, it does provide an assembly which requires only a minimum number of parts.

Figure 5:
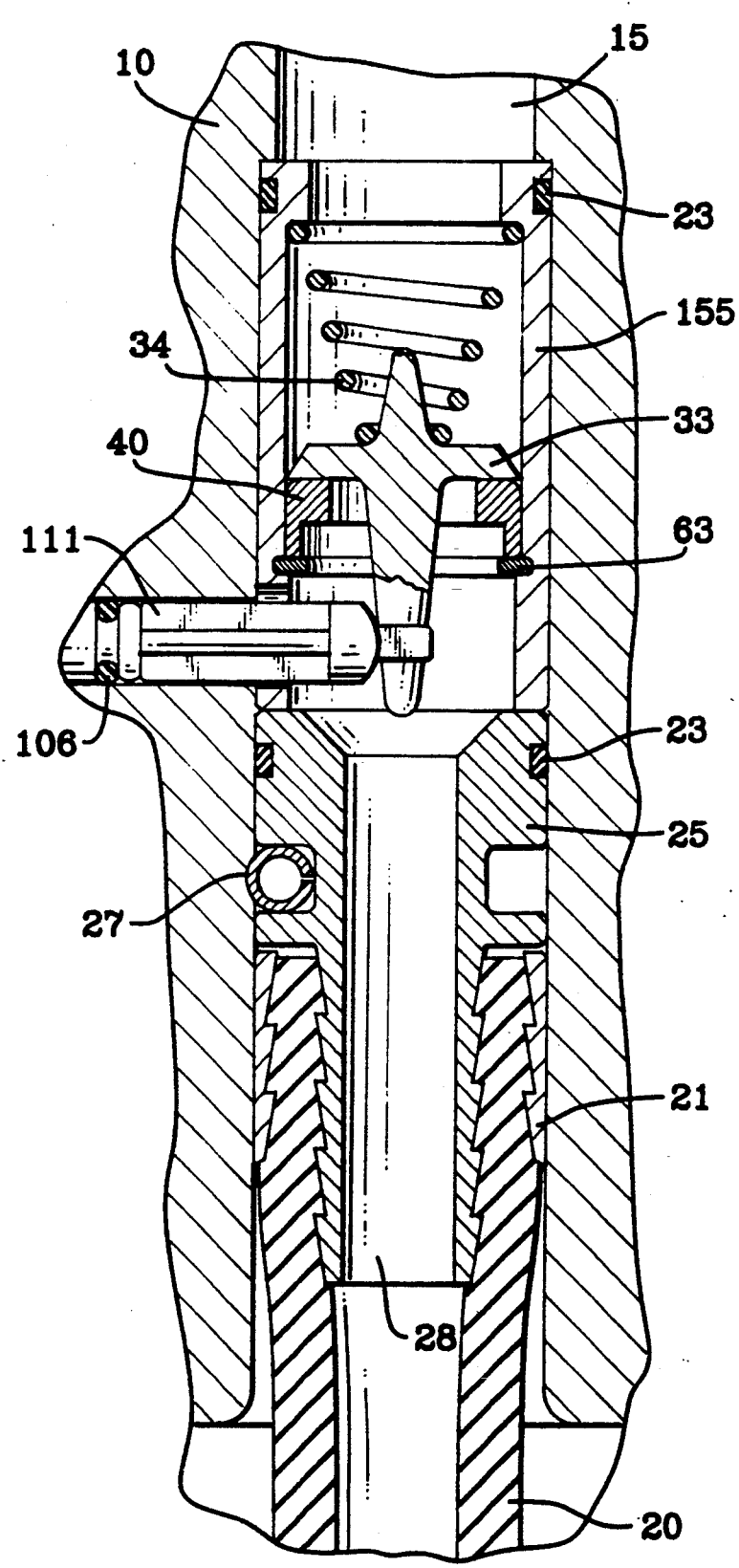
FIG. 5 is a schematic presentation of the fluid connection and control device applied to an outlet of a fluid machine.

FIG. 5 presents the fluid connection and control device of the present invention as it would be applied to the outlet of a fluid machine. It is similar to the embodiment shown in FIG. 3 with the exception that the fluid control module in this case is reversed so as to provide fluid control valving for an outward flow of fluid. Housing 10 has a fluid channel 15 in which a fluid control body 155 is fitted to form a seal with the channel by means of seal ring 23. Valve seat 40 is held within control body 155 by valve seat retainer 63. Valve element 33 is biased against valve seat 4 by valve spring 34. Actuator 111 protrudes through housing 10 into fluid channel 15 where it can act upon valve element 33 to control fluid flow through the valve. Actuator seal ring 16 prevents leakage around actuator 111 through housing 10. The fluid connection portion of this embodiment is precisely the same as tat described in FIG. 1.

This invention has been described and shown in its several embodiments. From this it is clear that the invention provides the advantages of easy assembly and disassembly as well as maximum flexibility of the fluid hose 20 at its exit point from the housing. This added flexibility can result in improved accessibility to the working sites of fluid machines.

What is claimed is:

1. A fluid connection and control device for assembly within a fluid channel bore of a pressure fluid operated machine comprising:
   a radially symmetrical body having first and second ends and a central axial fluid passage therebetween;
   means at the first end of said body for connecting to a pressure fluid carrying hose and defining a connection, said connection being within the confines of said bore;
   means at the second end of said body for selectively permitting or preventing flow of fluid therethrough; and
   means for capturing said body within said fluid channel bore of said pressure fluid operated machine.

2. The fluid connection and control device of claim 1, wherein the means for connecting to a pressure fluid carrying hose comprises a barbed nipple means for insertion into an end of said hose and a compression sleeve means for retaining said hose on said barbed nipple.

3. The fluid connection and control device of claim 1, wherein the means for selectively permitting or preventing flow of fluid comprises a valve seat, a valve element, means for biasing said valve element against said valve seat to prevent flow of fluid therethrough, and means for selectively displacing said valve element away from said valve seat to permit flow of fluid therethrough.

4. The fluid connection and control device of claim 1, further comprising:
   means for providing a fluid tight seal between said body and said fluid channel.

5. A pressure fluid connection device for a portable pressure fluid operated machine, comprising:
   a radially symmetrical body for insertion in a bore in said fluid machine having first and second ends within said bore and a central axial fluid passage therebetween;
   means at said first end for attachment of said body to a flexible hose whereby the attachment is within the confines of said bore;
   means at the second end for providing a circumferential fluid tight seal between said body and said bore of said fluid machine; and
   non-threaded means intermediate of said first and second ends for retaining said body in said bore.

6. The fluid connection device of claim 5, wherein the means for attachment to a flexible hose comprises a barbed nipple and a compression sleeve.

7. The fluid connection device of claim 5, wherein the means for providing a fluid tight seal comprises at least one resilient seal ring fitted in at least one external circumferential groove of said body.

8. The fluid connection device of claim 5, wherein the means for providing a fluid tight seal comprises a smooth outer surface on the radially symmetrical body which acts against a resilient seal in said fluid channel.

9. The fluid connection device of claim 5, wherein the means for retaining said body in said fluid channel comprises an external transverse recess on said body, a transverse bore tangentially intersecting said fluid channel, and an elongate member extending through said transverse bore and said transverse recess.

10. The fluid connection device of claim 5, further comprising:
   'means at the second end of said body for selectively permitting or preventing flow of fluid therethrough.

11. The fluid connection device of claim 9, wherein the means for selectively permitting or preventing flow of fluid comprises a valve seat within said central axial fluid passage, a valve element biased against said valve seat to prevent flow of fluid therethrough, and means for selectively displacing said valve element away from said valve seat to permit flow of fluid therethrough.

12. A fluid inlet connection and control device for an apparatus having a fluid powered motor within a housing and a pressure fluid channel for communicating pressure fluid from outside said housing to said motor, comprising:
- a fitting assembly having a central axial fluid passage connecting first and second ends thereof;
- means at said first end for connecting said fitting assembly to a fluid inlet hose within the confines of said pressure fluid channel;
- means at said second end for biasing a valve element against a valve seat to prevent fluid flow into said fluid powered motor;
- means for capturing said fitting assembly within a fluid flow channel of said apparatus;
- means for providing a fluid tight seal between said fitting assembly and said fluid flow channel of the apparatus; and
- means for selectively displacing said valve element counter to said bias to permit fluid flow from said fluid inlet hose, through said fluid flow channel, and into said fluid powered motor.

13. The fluid inlet connection and control device of claim 12, wherein the valve seat, the valve element, and the biasing means for said valve element are contained within the fitting assembly.

* * * * *